United States Patent
Landry (10) Patent No.: US 7,854,590 B2
(45) Date of Patent: Dec. 21, 2010

(54) ROTOR BLADE VISUAL LIGHTS

(75) Inventor: Martin Landry, Quebec (CA)

(73) Assignee: Bell Helicopter Textron Inc., Hurst, TX (US)

( * ) Notice: Subject to any disclaimer, the term of this patent is extended or adjusted under 35 U.S.C. 154(b) by 183 days.

(21) Appl. No.: 11/684,876

(22) Filed: Mar. 12, 2007

(65) Prior Publication Data
US 2008/0225536 A1 Sep. 18, 2008

(51) Int. Cl.
*F01D 25/00* (2006.01)
(52) U.S. Cl. .......................... 416/5; 416/103; 416/120; 244/17.11; 315/291
(58) Field of Classification Search .................. 244/6, 244/17.11, 21; 310/112–114, 154.01, 154.02, 310/154.06, 171; 340/815.45, 945, 971; 416/5, 103, 120; 315/291
See application file for complete search history.

(56) References Cited

U.S. PATENT DOCUMENTS

| | | | |
|---|---|---|---|
| 2,555,807 A | 6/1951 | Morris | |
| 2,891,741 A * | 6/1959 | Ellis, III et al. | 244/17.13 |
| 3,174,552 A | 3/1965 | Soucy | |
| 3,395,875 A | 8/1968 | Donovan | |
| 3,701,498 A | 10/1972 | Ferrara | |
| 3,710,311 A | 1/1973 | Avital | |
| 3,723,722 A * | 3/1973 | Van Iderstine et al. | 362/470 |
| 4,916,445 A | 4/1990 | Crossley | |
| 4,916,581 A | 4/1990 | Authier | |
| 5,377,934 A * | 1/1995 | Hill | 244/17.11 |
| 5,410,210 A * | 4/1995 | Sato et al. | 310/363 |
| 5,671,051 A | 9/1997 | Wright, Jr. | |
| 5,690,408 A | 11/1997 | de la Pena | |
| 5,793,164 A | 8/1998 | Authier | |
| 5,801,475 A | 9/1998 | Kimura | |
| 6,048,172 A | 4/2000 | Pniel | |
| 6,641,366 B2 | 11/2003 | Nordhoff | |
| 7,081,828 B2 * | 7/2006 | Low | 340/815.45 |
| 7,186,083 B2 * | 3/2007 | Bayly | 416/51 |
| 7,238,007 B2 * | 7/2007 | Wobben | 416/5 |

(Continued)

FOREIGN PATENT DOCUMENTS

DE 103 56 230 A1 7/2005

(Continued)

OTHER PUBLICATIONS

International Search Report issued in PCT/US2007/006149, Jun. 2, 2008, 5 pages.

(Continued)

*Primary Examiner*—Douglas W Owens
*Assistant Examiner*—Tung X Le
(74) *Attorney, Agent, or Firm*—Pillsbury Winthrop Shaw Pittman LLP (57) ABSTRACT

A rotorcraft, such a helicopter or a tiltrotor aircraft, includes a light emitting device configured to provide light at a tip of a rotor blade. The light emitting device includes a light emitting diode arranged on the rotor blade, and a power source, wherein the power source is configured to power the light emitting diode due to a movement of the rotor blade. The power source may include a piezo-electric material configured to create a voltage due to movements of the rotor blade or an electrical generator including a stationary magnet assembly and a moveable coil assembly arranged on a shaft that rotates the rotor blade.

20 Claims, 10 Drawing Sheets

U.S. PATENT DOCUMENTS

| | | |
|---|---|---|
| 7,324,016 B1 * | 1/2008 | Milgram ..................... 340/981 |
| 7,446,447 B2 * | 11/2008 | Takeuchi .................... 310/112 |
| 2002/0125368 A1 * | 9/2002 | Phelps et al. ............. 244/17.23 |
| 2003/0102780 A1 * | 6/2003 | Nakatsuka et al. .......... 310/366 |
| 2004/0075363 A1 | 4/2004 | Malkin |
| 2005/0231058 A1 * | 10/2005 | Down et al. ................ 310/192 |
| 2006/0049302 A1 * | 3/2006 | Kennedy et al. ......... 244/17.11 |
| 2006/0051207 A1 | 3/2006 | Becerra |
| 2006/0284736 A1 * | 12/2006 | Low .......................... 340/980 |
| 2007/0284885 A1 * | 12/2007 | Menges ....................... 290/55 |
| 2008/0084685 A1 * | 4/2008 | Van De Ven et al. .......... 362/84 |

FOREIGN PATENT DOCUMENTS

| | | |
|---|---|---|
| EP | 947 423 A2 | 10/1999 |
| EP | 1 227 335 A3 | 7/2002 |

OTHER PUBLICATIONS

Written Opinion of the International Searching Authority issued in PCT/US2007/006149, Jun. 2, 2008, 6 pages.

International Preliminary Report On Patentability for PCT/US2007/006149, issued on Apr. 14, 2009.

* cited by examiner

ROTOR BLADE VISUAL LIGHTS

BACKGROUND

1. Field of the Invention

The present application relates to an autonomous lighting device, and more particularly, to an autonomous lighting device for providing indications of the proximity of a rotor blade of a helicopter.

2. Description of Related Art

Various devices are currently used to illuminate the blades of a helicopter. For example, illumination of the rotor blades can be done by attachment of a chemiluminescent light stick to the tips of the blades. The chemiluminescent light provides an indication of the position of the rotor blade's tips. However, this system must generally be loaded prior to each use. In addition, it is not possible to selectively turn the device on and off in flight.

SUMMARY

In an embodiment of the invention, there is provided a rotorcraft including a light emitting device configured to provide light on a rotor blade. The light emitting device includes a light emitting diode arranged on the rotor blade; and a power source, wherein the power source is configured to power the light emitting diode due to a movement of the rotor blade.

In another embodiment of the invention, there is provided a rotor blade of a rotorcraft including a light emitting device configured to provide light on a rotor blade. The light emitting device includes a light emitting diode arranged on the rotor blade; and a power source, wherein the power source is configured to power the light emitting diode due to a movement of the rotor blade.

BRIEF DESCRIPTION OF THE DRAWINGS

Embodiments of the invention will now be described, by way of example only, with reference to the accompanying drawings in which corresponding reference symbols indicate corresponding parts, and in which.

DETAILED DESCRIPTION

Embodiments of the present invention are directed to an autonomous lighting device that is configured to provide indications as to the proximity and the position of the rotor blades of a helicopter. The lighting device may be mounted to the tips or other regions of the blades of the main rotor and/or the tail rotor. The lighting device is configured to provide reliable illumination during night and/or day operations in high vibration or movement locations.

Figure 1A:
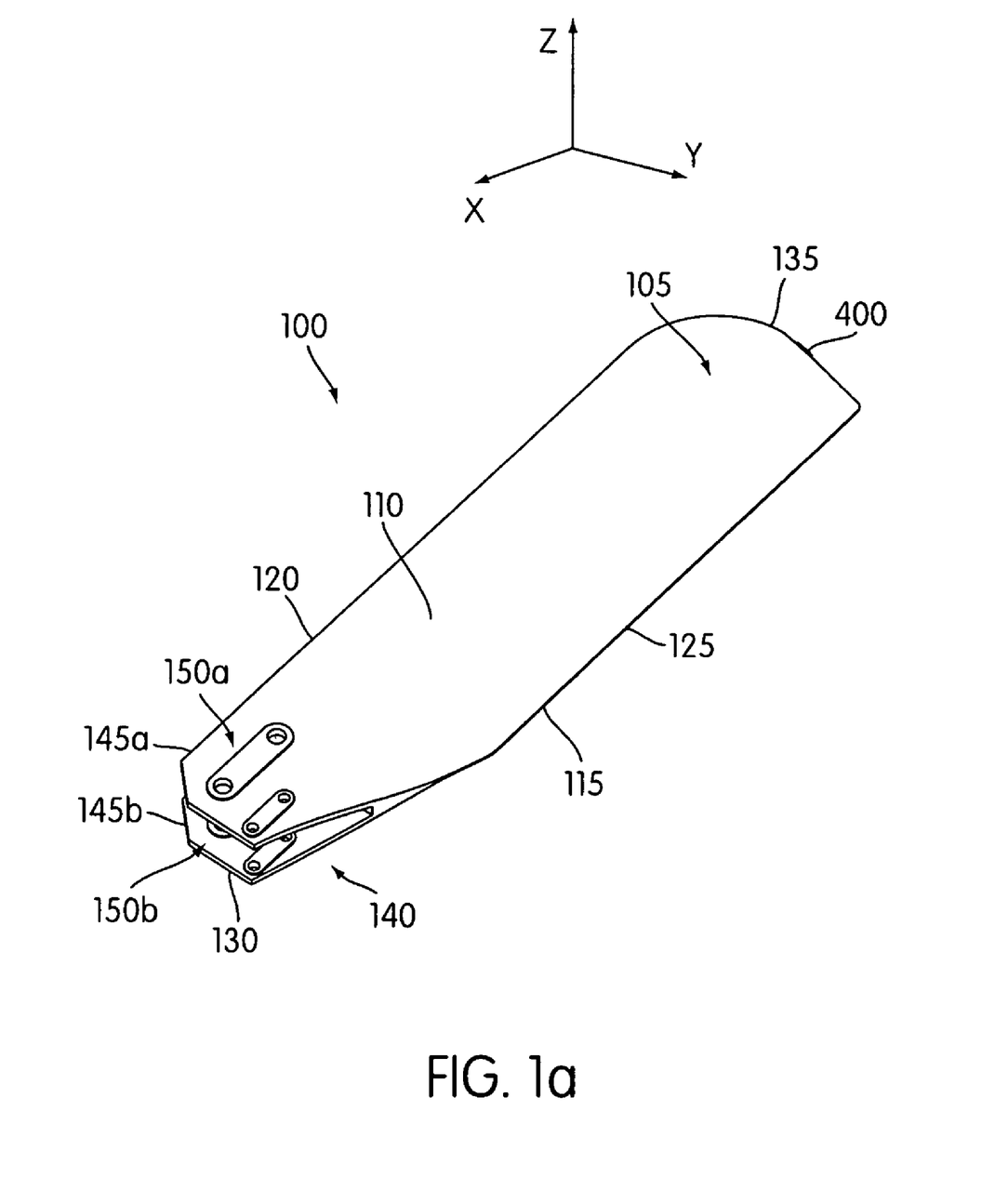
FIGS. 1a-b are schematic representations of a rotor blade of a helicopter in accordance with the embodiment of the invention.
Figure 1B:
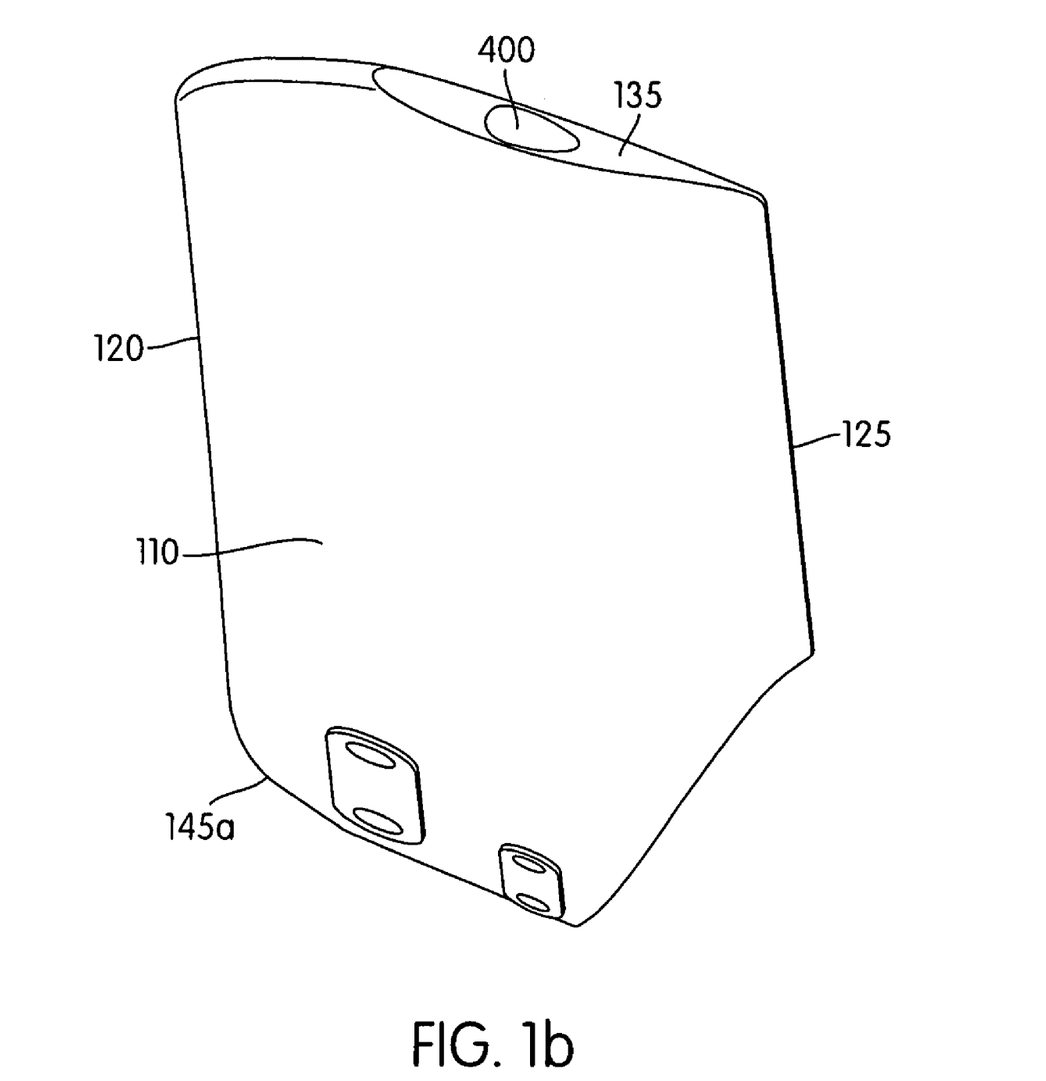

FIGS. 1a-b are schematic representations of a rotor blade 100 of a helicopter (not shown) in accordance with an embodiment of the invention. Rotor blade 100 includes a body 105 having a suction face 110 and a pressure face 115 opposite the suction face 110. The rotor blade 100 also includes a leading edge 120, a trailing edge 125, and an inboard and an outboard end 130, 135. The leading edge 120 and the trailing edge 125 define the longitudinal contour of the body 105 and extend between the inboard end 130 and the outboard end or tip of the blade 135. The body 105 of the rotor blade 100 has a tapering profile, as viewed in plane XZ, along the longitudinal direction of the blade 100 that extends from the inboard end 130 to the outboard end 135.

As known in the art, when the rotor blade 100 is moved through the air, a stream of air flows over the suction surface 110 and under the pressure surface 115. The rotor blade 100 is designed so that the flow of air is smooth and conforms to the shape of the moving rotor blade 100. When the rotor blade 100 is set at the proper angle and made to move fast enough, the airflow supports the weight of the rotor blade 100 and provides a upward force that furnishes enough lift to sustain the helicopter in flight.

Figure 2:
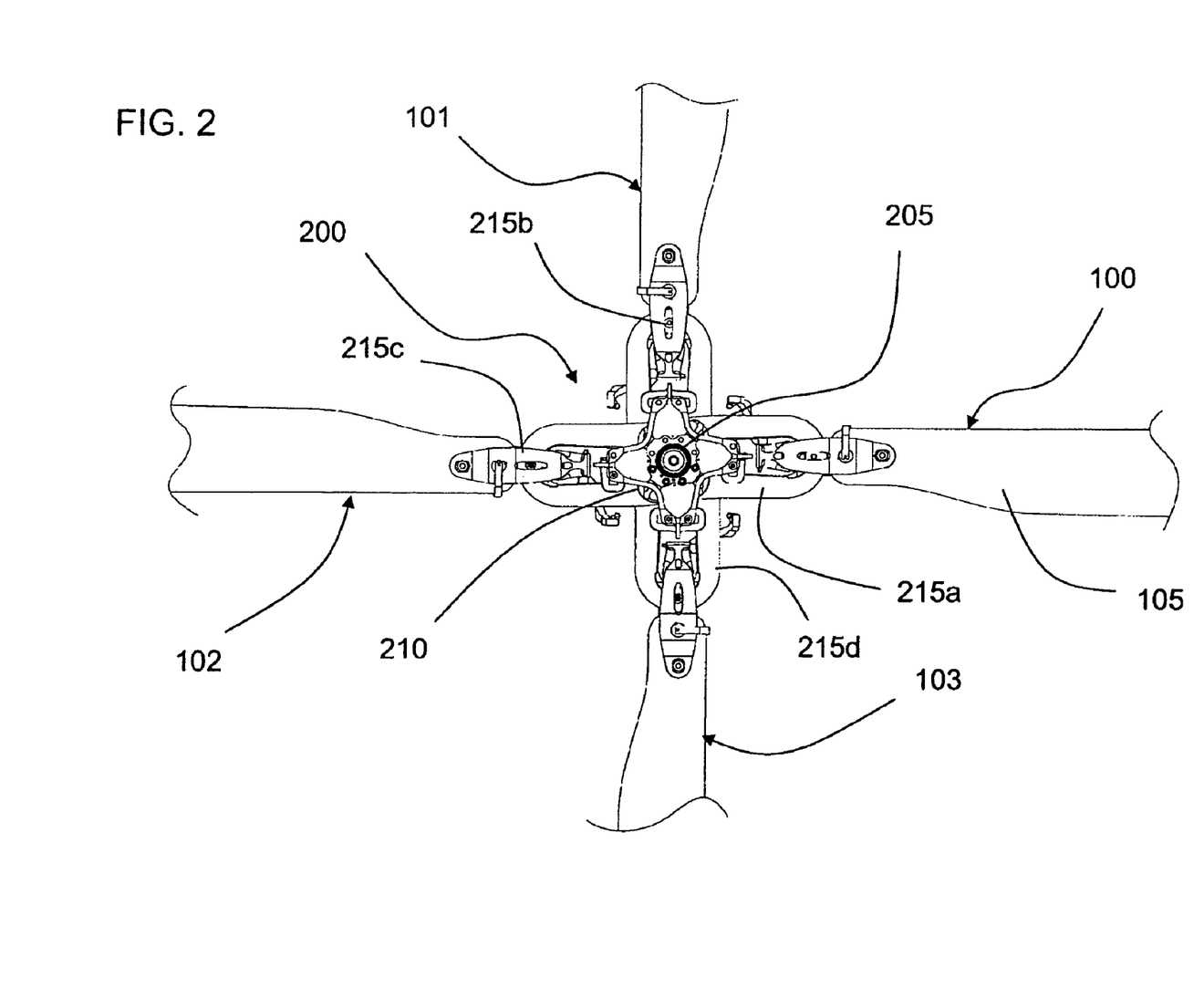
FIG. 2 shows a top view of several substantially identical rotor blades mounted to the rotor mast assembly of a helicopter in accordance with an embodiment of the invention.

The inboard end 130 includes an attachment device 140 configured to mount the body 105 of the rotor blade 100 to a rotor mast 205 of a helicopter (see FIG. 2). Specifically, the attachment device 140 includes a first and a second generally parallel arm 145a, 145b that are each provided with cylindrical openings 150a, 150b.

FIG. 2 shows a top view of several substantially identical rotor blades 100, 101, 102, 103 mounted to the rotor mast assembly 200 of a helicopter in accordance with an embodiment of the invention. To avoid redundancy, the discussion herein will focus on the attachment of the rotor blade 100, since the attachments of the other rotor blades 101, 102 and 103 to the rotor mast assembly 200 are substantially identical.

Rotor mast assembly 200 includes the rotor mast 205, a rotor hub 210, and a plurality of blade receiving portions 215a-d. The rotor hub 210 is slideably mounted to the rotor mast 205 and includes at a periphery thereof the plurality of blade receiving portions 215a-d. As can be seen in FIG. 2, generally parallel arms 145a, 145b of the rotor blade 100 are engaged in the blade receiving portion 215a. The rotor blade 100 is secured to the rotor mast assembly 200 via an attachment mechanism (not shown in FIG. 2).

Figure 6:
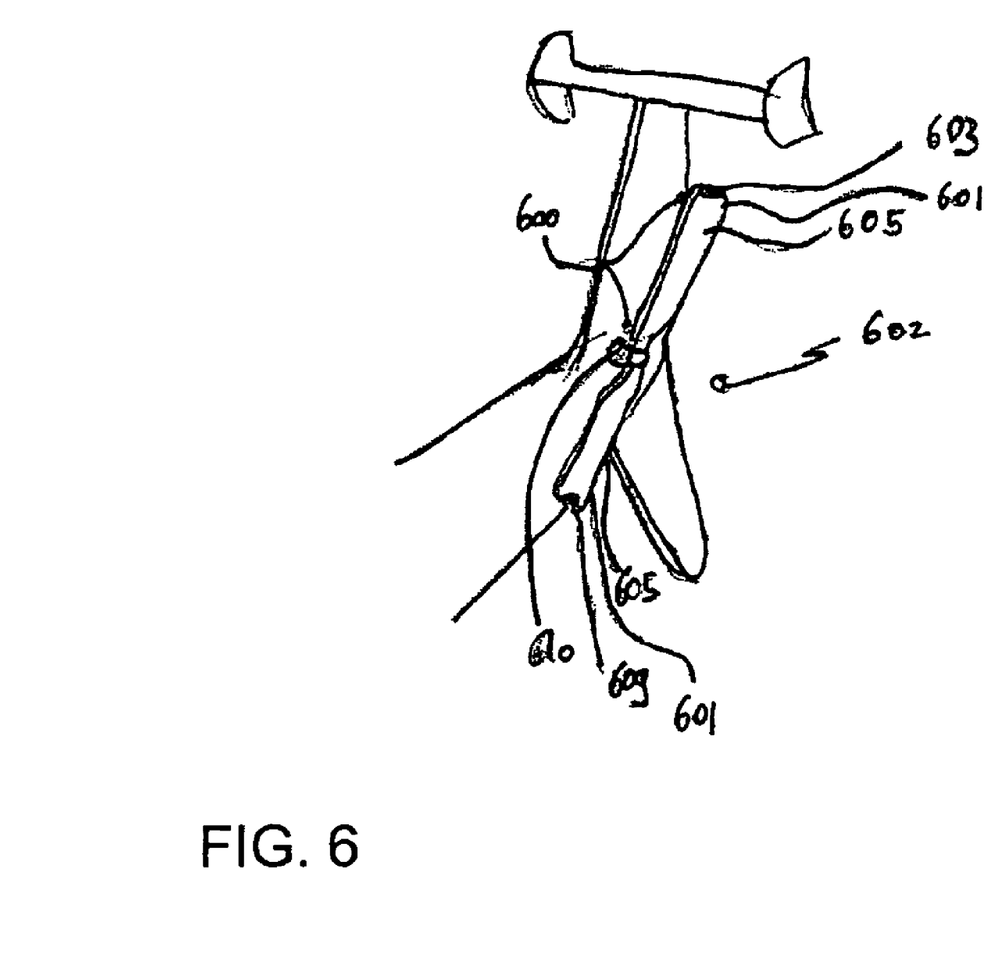
FIG. 6 shows a lighting device mounted to the tip of the tail rotor blade in accordance with an embodiment of the invention.

In this embodiment, the rotor mast assembly 200 is configured to receive four substantially identical rotor blades. It will be appreciated that the rotor mast assembly 200 may be configured to receive additional or fewer rotor blades in other embodiments. FIG. 6 shows an example of a tail rotor blade including two blades.

Figure 3:
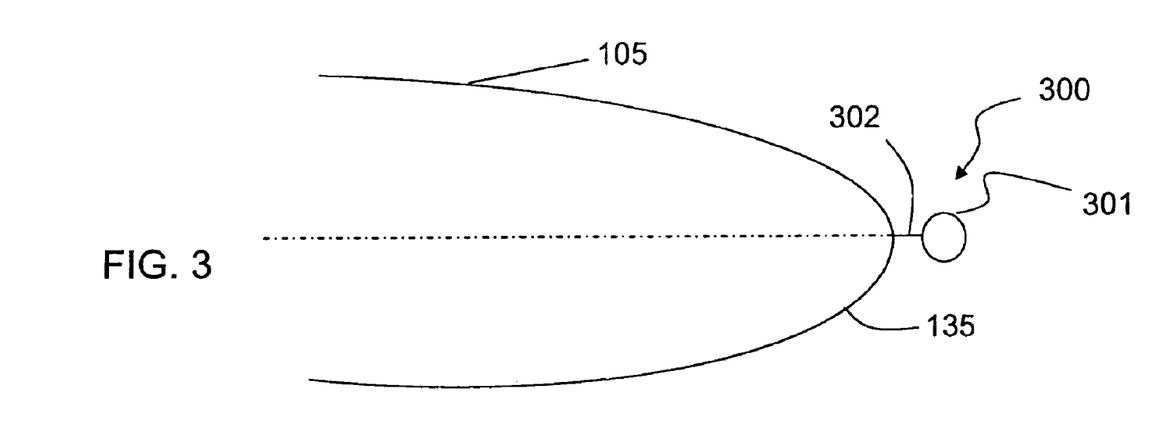
FIG. 3 shows a lighting device mounted to the outboard end or tip of the blade in accordance with an embodiment of the invention.

Referring now to FIG. 3, this figure shows a lighting device 300 mounted to the outboard end or tip of the blade 135 in accordance with an embodiment of the invention. The lighting device 300 includes a housing 301 that is attached to the outboard end 135 with a support 302. In the embodiment of FIG. 3, the housing 301 is arranged on the axis that extends along the longitudinal direction of the blade 100. However, it will be appreciated that the housing device 300 could be attached at a different position. For example, the housing device 300 could be positioned substantially below the body 105 of the blade 100.

Figure 4:
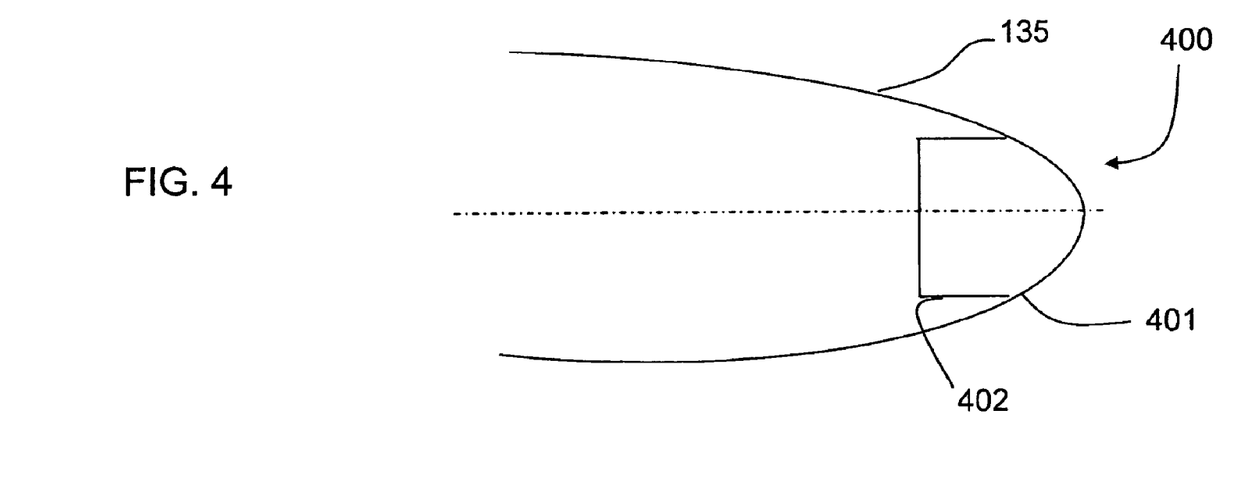
FIG. 4 shows a lighting device mounted to the outboard end or tip of the blade in accordance with another embodiment of the invention.

FIG. 4 shows a lighting device 400 mounted to the outboard end or tip of the blade 135 in accordance with another embodiment of the invention. The lighting device of FIG. 4 may be similar to that described in FIG. 3 and includes a housing 401 arranged in a recess portion 402 formed within the body 105. This configuration may be preferred over that shown in FIG. 3 as it does not create a drag on the blade. The housing 401 can be secured to the blade 100 during its manufacture. In this implementation, the housing 401 is part of the blade. In another implementation, the housing 401 can be removably engaged within the recess portion 401 formed in the blade.

Figure 5:
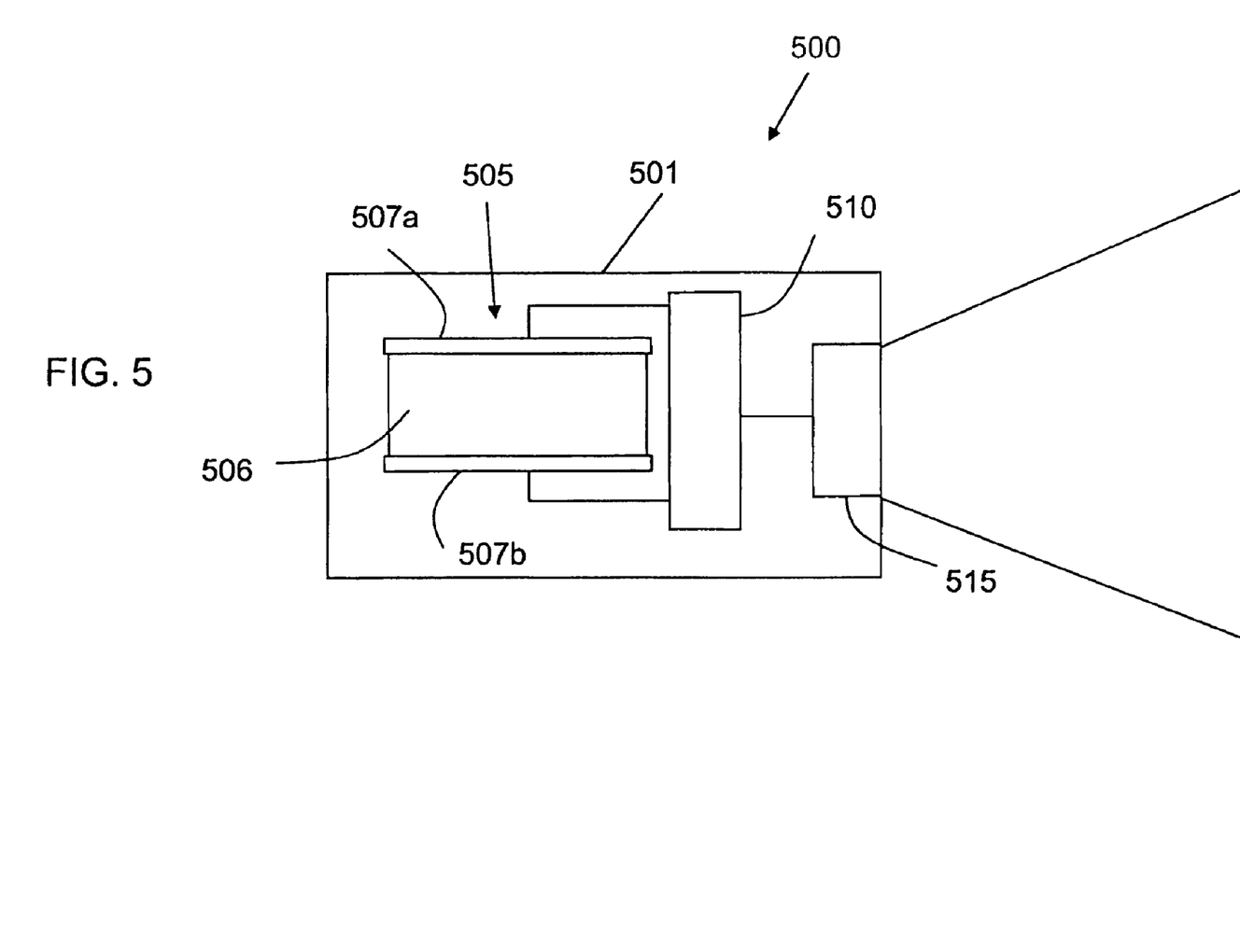
FIG. 5 shows a schematic representation of such a self-powered lighting device in accordance with an embodiment of the invention.

The lighting device shown in FIGS. 3 and 4 is an autonomous lighting device that includes a power source and a lamp. This autonomous lighting device is configured to withstand the high centrifugal force created during rotation of the blades. In one implementation, the autonomous lighting device is configured to withstand centrifugal forces of about 300 Gs. FIG. 5 shows a schematic representation of such an autonomous lighting device in accordance with an embodiment of the invention. The lighting device 500 includes a casing 501 that houses a power source 505, a rectifier circuit 510 and a light emitting diode 515. The casing 501 may be an epoxy casing or may be made of any other material capable of withstanding stress generated during rotation of blade 100.

The power source 505 includes a piezoelectric material 506 sandwiched between two electrodes 507a-b. The power source 505 may be referred to as a piezo electric source. The piezoelectric material 506 may be a crystal of quartz, berlinite ($AlPO_4$) or gallium orthophosphate ($GaPO_4$). In one implementation, ceramics with perovskite or tungsten-bronze structures ($BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$) or polymer materials can be used. When the piezoelectric material 506 is bent or struck due to the vibrations or movements of the blade 100, it becomes electrically polarized which causes a charge production and a voltage at the electrodes 507a-b. The voltage generated at the electrodes 507a-b is then used to power the lamp or light emitting diode 515. A rectifier circuit 510 may be used to adapt the voltage or the intensity of the current supplied to the lamp 515.

The size and type of materials of the piezoelectric material 506 included in power source 505 are selected based on the power needed to power the lamp 515 and on the frequency and amplitudes of the vibrations or movements of the portion of blade 100 where the power source 505 is positioned. Determination of the appropriate location of the piezoelectric material 506 and power source 505 is based on the geometry of the blade, the blade's materials and the operating limits of the helicopter (e.g. speed rotor, power turbine). Thus, in an embodiment, a method of manufacturing a blade includes determining the frequency and amplitude of the vibrations or movements produced by a segment of the blade as a function of its position on the blade and/or the blade's materials and/or the operating limits of the helicopter. Once the frequency and amplitude of each segment of the blade are determined, the method proceeds to selecting the appropriate location, the size and the type of piezoelectric material based on the power needed to power the lamp. In addition, it will be appreciated that the number of lamps powered by the power source 505 may also determine the size and the type of materials. In the embodiment shown in FIG. 5, the power source 505 is configured to power a single lamp. In another embodiment, the power source 505 is configured to power multiple lamps that are arranged at different locations along blade 100.

In the embodiment of FIG. 5, the lamp 515 includes at least one light emitting diode (LED) that has a wide viewing angle of at least about 40°. The LED 515 is configured to be viewed during day and/or night. Examples of LEDs that can be used in an embodiment include super luminosity LEDs having a wide viewing angle. These types of LEDs are configured to produce light intensity of at least 130 mwatts and to output an illumination beam having a radiation wavelength of about, for example, 625 nm with a spectrum radiation bandwidth of about 20 nm. In an embodiment, the LEDs may be chosen to output an illumination beam in a range from about 500 nm to about 650 nm, preferably in a range between about 600 nm and 650 nm.

In the embodiment of FIG. 5, the power source 505, the rectifier circuit 510 and the LED 515 are embedded in a same casing 501. In another configuration, these elements may be arranged at separate locations within or outside the blade. For example, the power source 505 may be arranged at a higher vibration location along blade 100. In this configuration, electrical wires may be arranged along blade 100 to conduct the electrical signal generated by the power source 505 to the rectifier circuit 510. Electrical wires that may be used in one implementation include ribbon conductors or thin tapes with conductive strips embedded between them. Although the lighting device 500 is configured to supply light at the blade's tips of the main rotor, it will be appreciated that the same arrangement could also be made at the blade's tips of the tail rotor.

FIG. 6 shows a lighting device 600 mounted to the tip 601 of the tail rotor blade 605 in accordance with an embodiment of the invention. The lighting device 600 may include a light emitting diode 603 similar to that described in FIG. 5. The lighting device 600 is powered by a power source including an electrical generator 610 mounted to the shaft of the tail rotor 602.

Figure 7A:
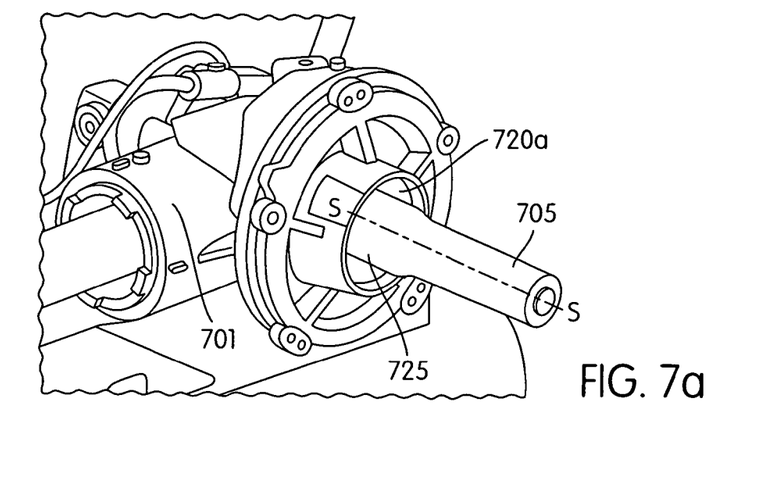
FIGS. 7a-c show the assembly of the electrical generator in accordance with an embodiment of the invention.
Figure 7B:
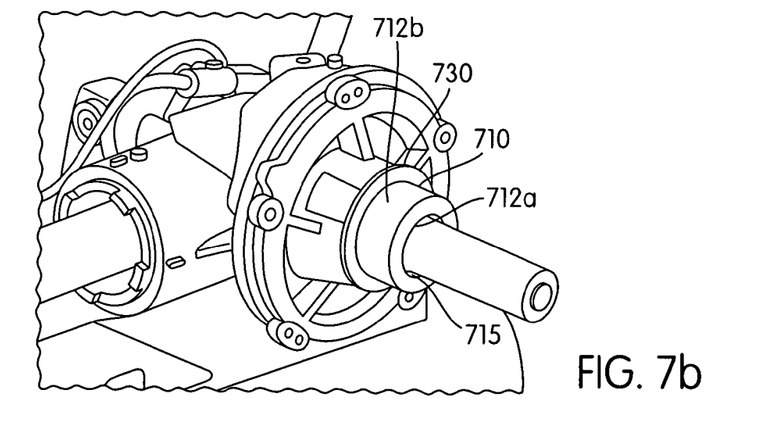
Figure 7C:
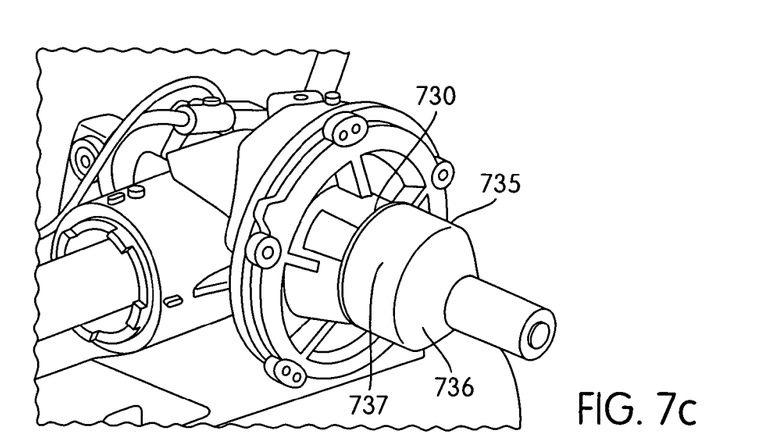

Referring now to FIGS. 7a-c, these figures show the assembly of the electrical generator 610 in accordance with an embodiment of the invention. The tail rotor 602 includes a tail rotor gear box 701 and a tail rotor shaft 705. The tail rotor gear box 701 is configured to transmit power from the engine(s) (not shown) of the helicopter to the tail rotor shaft 705.

As shown in FIGS. 7b-c, the electrical generator 610 includes a magnet assembly 710 that is coupled to the tail rotor gear box 701. The magnet assembly 710 is a hollow cylindrical magnet having an interior surface that surrounds the lower portion of the tail rotor shaft 705. The magnet assembly 710 abuts, and is secured to, a cylindrical plate 730 that is attached to the tail rotor gear box 701.

The magnet assembly 710 may be a one piece element or may include a plurality of magnetized segments that are joined together to form a hollow cylindrical magnet. The magnetization of each of the magnetized segments or the one piece element may be oriented substantially perpendicular to the S-S axis of the tail rotor shaft 705. The magnet assembly 710 is configured to provide a substantially uniform magnetic field and may be manufactured with various materials having a high iron content including, for example, steel.

Figure 8A:
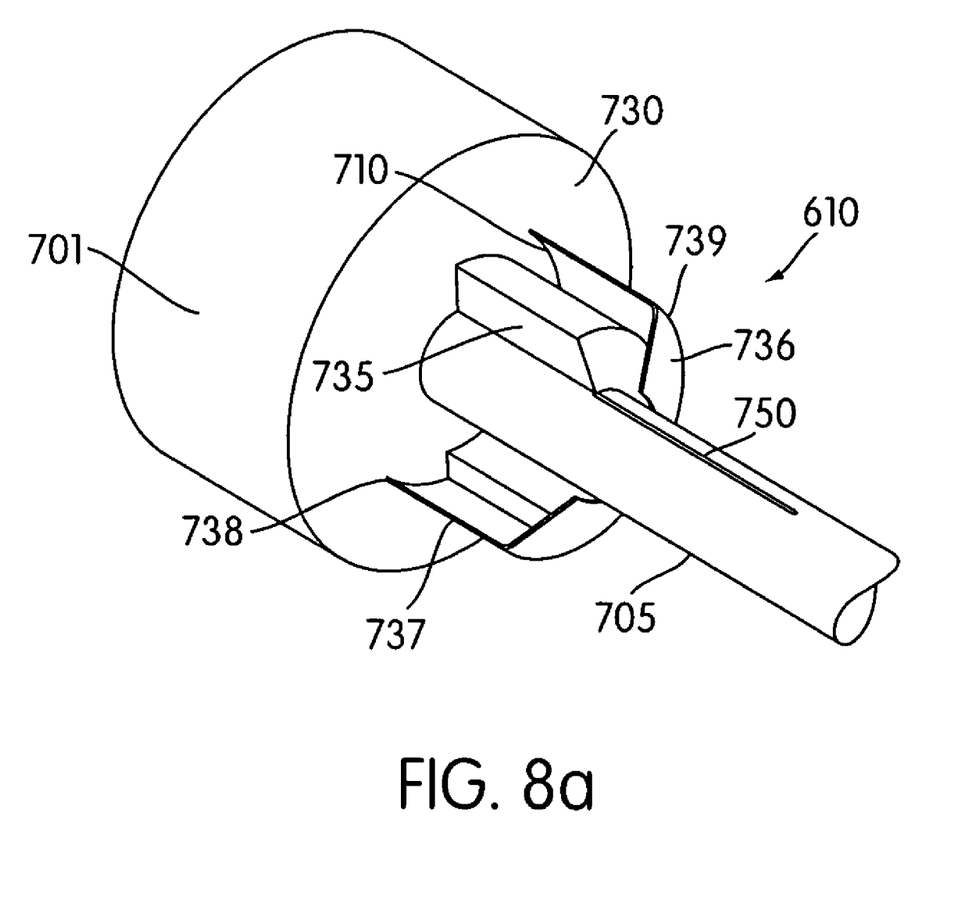
FIGS. 8a-b show a magnet assembly of the electrical generator in accordance with an embodiment of the invention.
Figure 8B:
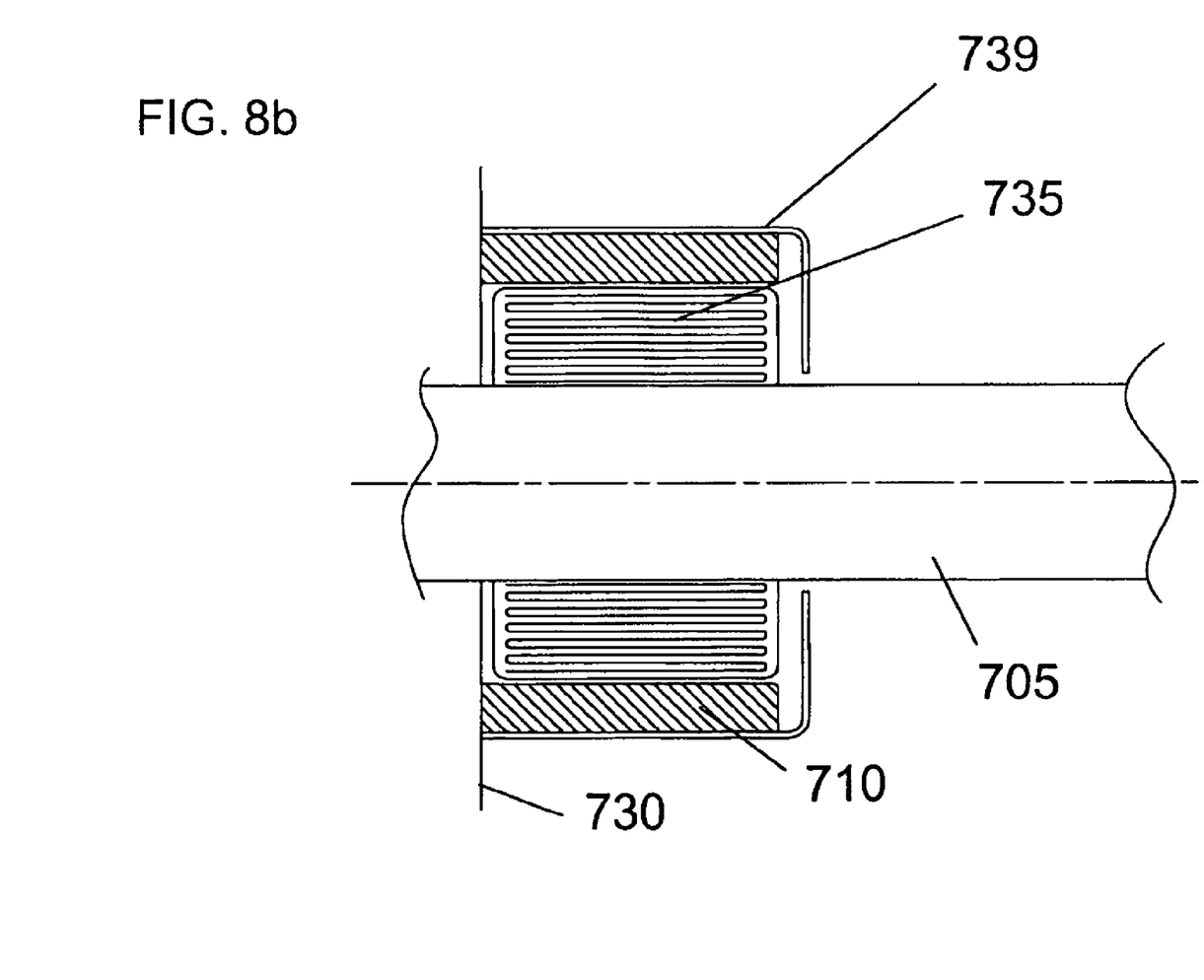

As shown in FIGS. 8a-b, which are schematic representations of the assembly shown in FIGS. 7a-c, the electrical generator 610 also includes a coil assembly 735 that is configured to cooperate with the magnet assembly 710. The coil assembly 735 is positioned between the tail rotor shaft 705 and the magnet assembly 710 as shown in FIG. 8*a*. The coil assembly 735 is coupled to the tail rotor shaft 705 such that rotation of the tail rotor shaft 705 rotates the coil assembly 735. A cover 739 includes a first top portion 736 and a second cylindrical portion 737 protects the magnet assembly 710 from the outside environment. The cover 739 has an end 738 that abuts the cylindrical plate 730.

FIG. 8*b* shows a cross section view of the electrical generator 610 shown in FIG. 8*a*. As shown in FIG. 8*b*, the magnet assembly 710 abuts the cylindrical plate 730. The coil assembly 735 is positioned between the tail rotor shaft 705 and the magnet assembly 710 and secured to the shaft 705. The coil assembly 735 includes a plurality of coils 740.

Rotation of the tail rotor shaft 705 rotates the coil assembly 735 in the magnetic field produced by the magnet assembly 710. In order to generate an electric current in the coil assembly 735, the plurality of coils 740 are arranged in the form of loops that are positioned substantially parallel to the shaft 705, as shown in FIG. 8*b*. The electric current produced in the plurality of coils 740 is transmitted to the blades 605 via a wiring assembly 750 arranged within the tail rotor shaft 705 or on the exterior surface of the tail rotor shaft 705. Blade wires including ribbon conductors can then be used to transmit the electric current from the wire assembly 750 to the lighting device 604. 600 arranged at the tip of each blade 605.

Figure 9:
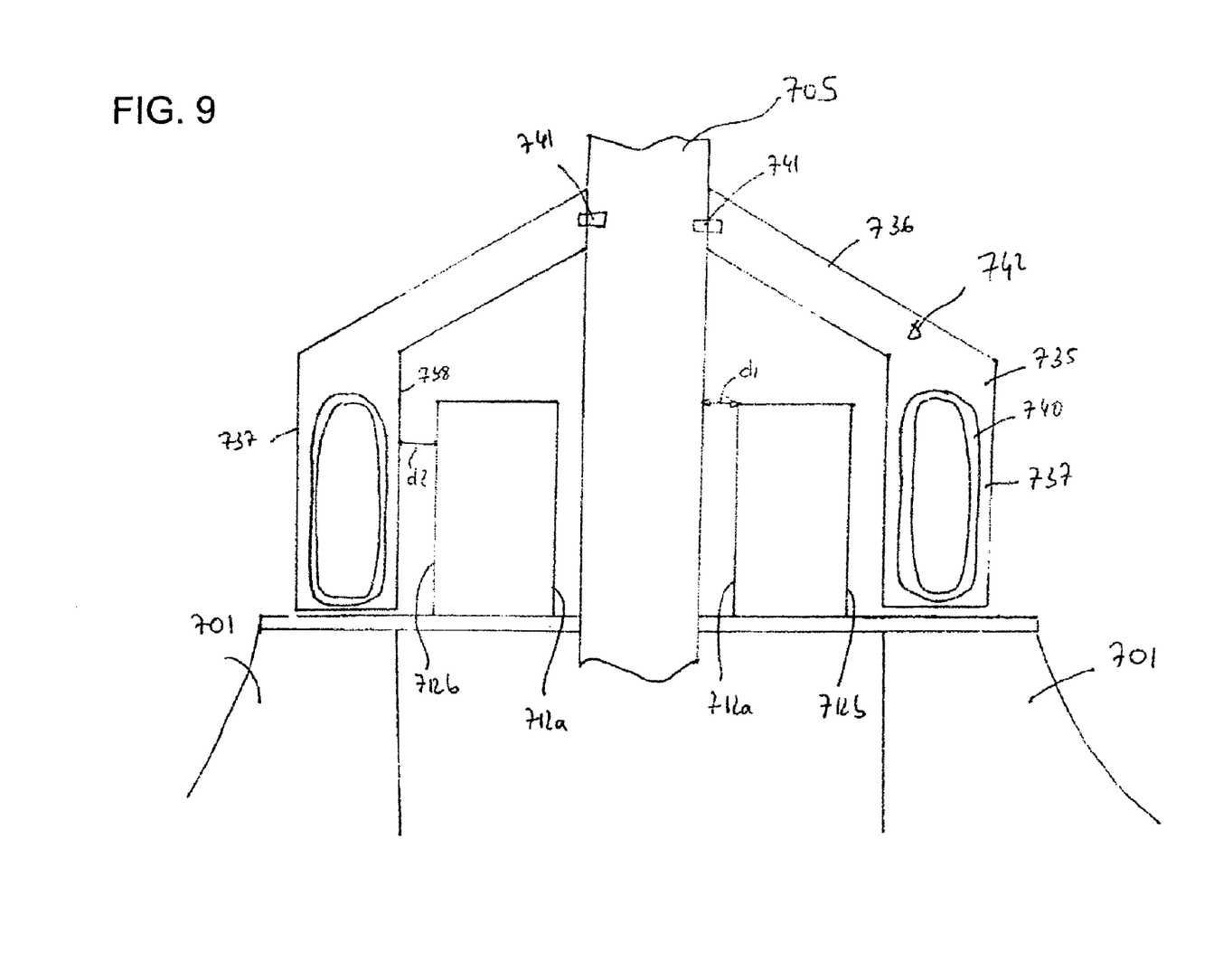
FIG. 9 shows an electric generator in accordance with another embodiment of the invention.

Referring now to FIG. 9, this figure shows a cross section of the electrical generator 610 mounted to the tail rotor shaft 705, in accordance with another embodiment of the invention. The magnet assembly 710 is positioned on the cylindrical plate 730. An attachment device (not shown in FIG. 9) is adapted to attach the magnet assembly 710 to the tail rotor box 701. The magnet assembly 710 defines a first space d1 between the interior surface 712*a* of the magnet assembly 710 and the outer skin of the tail rotor shaft 705. In an embodiment, the first space d1 is in a range between about 0.030 and 0.125 inches. The magnet assembly 710 also includes an exterior surface 712*b*.

As shown in FIG. 9, the coil assembly 735 is secured to the tail rotor shaft 705 via an attachment device 741. In one configuration, the attachment device 741 may include a set of screws. The coil assembly 735 includes a plurality of coils 740 that are arranged within a casing 742 of the cylindrical portion 737. The size, diameter and number of coils may vary depending on the desired current intensity. Examples of materials that may be used for the coils 740 include copper. The casing 742 is adapted to shield the coils 740 from the outside environment. Examples of materials that may be used for the casing 742 include non-magnetic material. The magnet assembly 710 defines a second space d2 between the exterior surface 712*b* and the interior surface 738 of the cylindrical portion 737. In one implementation, the second space d2 is in a range between 0.03 and 0.250 inches.

Rotation of the tail rotor shaft 705 rotates the coil assembly 735 in the magnetic field produced by the magnet assembly 710. In order to generate an electric current in the coil assembly 735, the plurality of coils 740 are arranged in the form of loops that are positioned substantially parallel to the exterior surface 712*b* of the magnet assembly 710, as shown in FIG. 9. The electric current produced in the plurality of coils 740 is transmitted to the blades 605 via a wiring assembly arranged within the tail rotor shaft 705 or on the exterior surface of the tail rotor shaft 705. Blade wires including ribbon conductors can then be used to transmit the electric current from the wire assembly to the lighting device 600 arranged at the tip of each blade 605.

While the lighting device 600 is implemented in a tail rotor of the helicopter, it will be appreciated that a similar arrangement could be made on the main rotor.

In an embodiment of the invention, the electrical power generated by the power source including a piezo-electric material or the power source including the electrical generator may be used to power a lamp that is arranged at a location other than the tip of the blade. This configuration may be desirable in the event the lamp is not adapted to withstand either the centrifugal force generated at the blade's tip or the vibrations or movements of the blade. For example, the lamp may be positioned at a location proximate the rotor shaft. An optic fiber may then be used to relay the light emitted by the lamp to the tip of the blades and/or at other locations on the blade.

It will be appreciated that the concepts disclosed herein are equally applicable to structures other than those illustrated herein in the attached figures. For example, the lighting device disclosed above may be incorporated into other parts of aircrafts or other vehicles. In one implementation, the power source including the piezo-electric material may be positioned at a high vibration or movement location, other than a blade.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

The foregoing embodiments have been provided to illustrate the structural and functional principles of the present invention, and are not intended to be limiting. To the contrary, the present invention is intended to encompass all modifications, alterations, and substitutions within the spirit and scope of the appended claims.

It will be appreciated that the lighting device may be implemented in any type of rotorcraft such, for example, a conventional helicopter or a tiltrotor aircraft. A tiltrotor aircraft has three modes of operation: airplane mode, helicopter mode and transition mode. In addition, it will also be appreciated that the light emitting device may also be implemented in any device or vehicle that includes a rotor blade.

What is claimed is:

1. A rotorcraft comprising a light emitting device configured to provide light on a rotor blade, the light dinning device including:
    a light emitting diode arranged on the rotor blade; and
    a power source connected to the light emitting diode, the power source including a piezo-electric material sandwiched between two electrodes, the power source being configured to provide power to the light emitting diode so that the light emitting diode is able to emit light,
    wherein, in use the power source is configured to power the light emitting diode using a voltage generated by the piezo-electric material due to a movement of the rotor blade, and
    wherein the piezo-electric material is configured and positioned on the rotor blade to create a voltage between the two electrodes due to vibrations of the rotor blade to power the light emitting diode.

2. The rotorcraft of claim 1, further comprising a rectifier circuit configured to adjust the voltage supplied to the light emitting diode.

3. The rotorcraft of claim 2, wherein the light emitting diode, the power source and the rectifier circuit are arranged in a casing provided at the tip of the rotor blade.

4. The rotorcraft of claim 1, wherein the piezo-electric material is arranged at a location on the rotor blade that generates high vibrations.

5. The rotorcraft of claim 1, wherein the piezo-electric material includes quartz, berlinite ($AlPO_4$), gallium orthophosphate ($GaPO_4$), perovskite or a polymer material.

6. The rotorcraft of claim 1, wherein the light emitting diode is configured to emit a radiation having a wavelengh between about 600 nm and about 650 nm.

7. The rotorcraft of claim 1, further comprising ribbon conductors arranged on a surface of the rotor blade, the ribbon conductors configured to transmit an electric current generated by the power source to the light emitting diode.

8. The rotorcraft of claim 1, wherein the light emitting device is removably engaged at the tip of the rotor blade.

9. The rotorcraft of claim 1, wherein the light emitting device is configured to withstand centrifugal force of about 300 Gs.

10. The rotorcraft of claim 1, wherein the rotorcraft is a helicopter or a tiltrotor aircraft.

11. The rotorcraft of claim 1, wherein the light emitting diode is arranged at a tip of the rotor blade.

12. A rotor blade of a rotorcraft comprising a light emitting device configured to provide light on the rotor blade, the light emitting device including:
   a light emitting diode arranged on the rotor blade; and
   a power source connected to the light emitting diode, the power source including a piezo-electric material sandwiched between two electrodes, the power source being configured to provide power to the light emitting diode so that the light emitting diode is able to emit light,
   wherein, in use the power source is configured to power the light emitting diode using a voltage generated by the piezo-electric material due to a movement of the rotor blade, and
   wherein the piezo-electric material is configured and positioned on the rotor blade to create a voltage between the two electrodes due to vibrations of the rotor blade to power the light emitting diode.

13. The rotor blade of claim 12, further comprising a rectifier circuit configured to adjust the voltage supplied to the light emitting diode.

14. The rotor blade of claim 13, wherein the light emitting diode, the power source and the rectifier circuit are arranged in a casing provided at the tip of the rotor blade.

15. The rotor blade of claim 12, wherein the piezo-electric material is arranged at a location on the rotor blade that generates high vibrations.

16. The rotor blade of claim 12, wherein the piezo-electric material includes quartz, berlinite ($AlPO_4$), gallium orthophosphate ($GaPO_4$), perovskite or a polymer material.

17. A rotorcraft comprising a light emitting device configured to provide light on a rotor blade, the light emitting device including:
   a light emitting diode;
   an optical fiber configured to guide light emitted by the light emitting diode to a desired location in the rotor blade; and
   a power source connected to the light emitting diode,
   wherein the power source is configured to power the light emitting diode due to a movement of the rotor blade, and
   wherein the power source includes a piezo-electric material that is configured to create a voltage due to vibrations of the rotor blade to power the light emitting diode.

18. The rotorcraft of claim 17, wherein the piezo-electric material is arranged at a location on the rotor blade that generates high vibrations.

19. The rotorcraft of claim 17, wherein the piezo-electric material includes quartz, berlinite ($AlPO_4$), gallium orthophosphate ($GaPO_4$), perovskite or a polymer material.

20. The rotorcraft of claim 17, wherein the light emitting diode is configured to emit a radiation having a wavelength between about 600 nm and about 650 nm.

* * * * *